United States Patent [19]

Uchida

[11] 4,231,064
[45] Oct. 28, 1980

[54] VERTICAL SYNCHRONIZATION CIRCUIT FOR A CATHODE-RAY TUBE

[75] Inventor: Tomoaki Uchida, Iwai, Japan

[73] Assignee: Victor Company of Japan Ltd., Yokohama, Japan

[21] Appl. No.: 39,333

[22] Filed: May 15, 1979

[30] Foreign Application Priority Data

May 18, 1978 [JP] Japan .............................. 53-65787[U]
May 18, 1978 [JP] Japan .............................. 53-65788[U]

[51] Int. Cl.² ............................................ H04N 5/04
[52] U.S. Cl. .................................................. 358/158
[58] Field of Search ............... 358/148, 150, 158, 159; 331/20

[56] References Cited

U.S. PATENT DOCUMENTS

| | | | |
|---|---|---|---|
| 3,688,037 | 8/1972 | Ipri | 358/158 |
| 3,691,297 | 9/1972 | Merrell | 358/158 |
| 3,814,855 | 6/1974 | Kokado | 358/148 |
| 3,899,635 | 8/1975 | Steckler | 358/158 |
| 3,906,155 | 9/1975 | van Straaten | 358/158 |
| 4,063,288 | 12/1977 | Eckenbrecht | 358/148 |

Primary Examiner—John C. Martin
Attorney, Agent, or Firm—Haseltine, Lake & Waters

[57] ABSTRACT

A vertical synchronization circuit for a cathode-ray tube comprises an oscillator for generating, in response to the horizontal synchronizing signal of an input video signal, clock pulses at twice the horizontal scanning frequency; a counter for counting the clock pulses and producing a first pulse when the pulse count reaches 525; a waveform shaping circuit receiving the vertical synchronizing signal of the input video signal and the clock pulses for producing a second pulse; a circuit for shaping the first pulse to produce a phase-comparing pulse; a phase comparator for comparing the phases of the phase-comparing pulse and the second pulse; a switching circuit controlled by the phase comparator for supplying the second pulse to the counter as a reset pulse when the phase comparator does not detect continuous coincidence during a specific vertical scanning period and for supplying the first pulse to the counter as a reset pulse when the phase detector detects continuous coincidence during the vertical scanning periods; and a circuit for shaping pulses produced by the counter in synchronism with the received vertical synchronizing signal.

5 Claims, 4 Drawing Figures

VERTICAL SYNCHRONIZATION CIRCUIT FOR A CATHODE-RAY TUBE

BACKGROUND OF THE INVENTION

The present invention relates to vertical synchronization circuits used in vertical deflection circuit systems for cathode-ray tubes and more particularly to a vertical synchronization circuit capable of stably generating pulses synchronized with the vertical synchronizing signal.

A vertical deflection circuit system known heretofore for a cathode-ray tube has comprised a circuit for separating the vertical synchronizing signal from the composite video signal from a video detection circuit, an oscillation circuit for oscillating in synchronism with the vertical synchronizing signal thus separated, and a circuit for forming a saw-tooth wave for vertical deflection in synchronism with the resulting oscillation output signal. Thus, in this known circuit system, a signal for vertical deflection is obtained by using an oscillation circuit which oscillates in synchronism with the vertical synchronizing signal. For this reason, in the case where the vertical synchronizing signal is not introduced as input for a short period for some reason, or in the case where noise becomes admixed, the vertical synchronization is disrupted, or it becomes unstable, whereby full interlacing of the cathode-ray tube becomes impossible. Another problem which arises is that it is necessary to adjust the oscillation frequency of the above mentioned oscillation circuit.

Accordingly, in order to overcome these difficulties, a vertical synchronization circuit of a count-down system, in which the present invention can be applied, has heretofore been proposed. However, in this system, also, with a conventional circuit organization, disruption of the vertical synchronization disadvantageously occurs when the vertical synchronizing pulses are not generated.

Furthermore, there are instances wherein the level of the tip of the vertical synchronizing signal in the composite video signal is constricted relative to the level of the tip of the horizontal synchronizing signal. This is observed in the case where there is a ghost image or in signals which have been transmitted via a large number of satellite stations. In such a case, the vertical synchronization becomes unstable. In addition, with a conventional circuit organization, in the case where the pulse width of the separated input vertical synchronizing signal is very narrow in the pulse forming circuit, or in the case where noise is admixed immediately before the input vertical synchronizing signal, erroneous operation occurs, whereby formation of normal vertical synchronizing pulses cannot be carried out.

SUMMARY OF THE INVENTION

Accordingly, it is a general object of the present invention to provide a novel and useful vertical synchronization circuit in which the above described difficulties encountered in known circuits have been overcome.

Another and specific object of the invention is to provide a vertical synchronization circuit which is capable, even in the case where noise is admixed immediately before the input vertical synchronizing signal which has been separated, of generating a signal synchronized with the vertical synchronizing signal in a normal manner without being influenced by this noise.

Still another object of the invention is to provide a vertical synchronization circuit capable of stably generating a signal synchronized with the vertical synchronizing signal irrespective of the pulse width of the input vertical synchronizing signal.

Other objects and further features of the invention will be apparent from the following detailed description when read in conjunction with the accompanying drawings.

DETAILED DESCRIPTION

Figure 1:
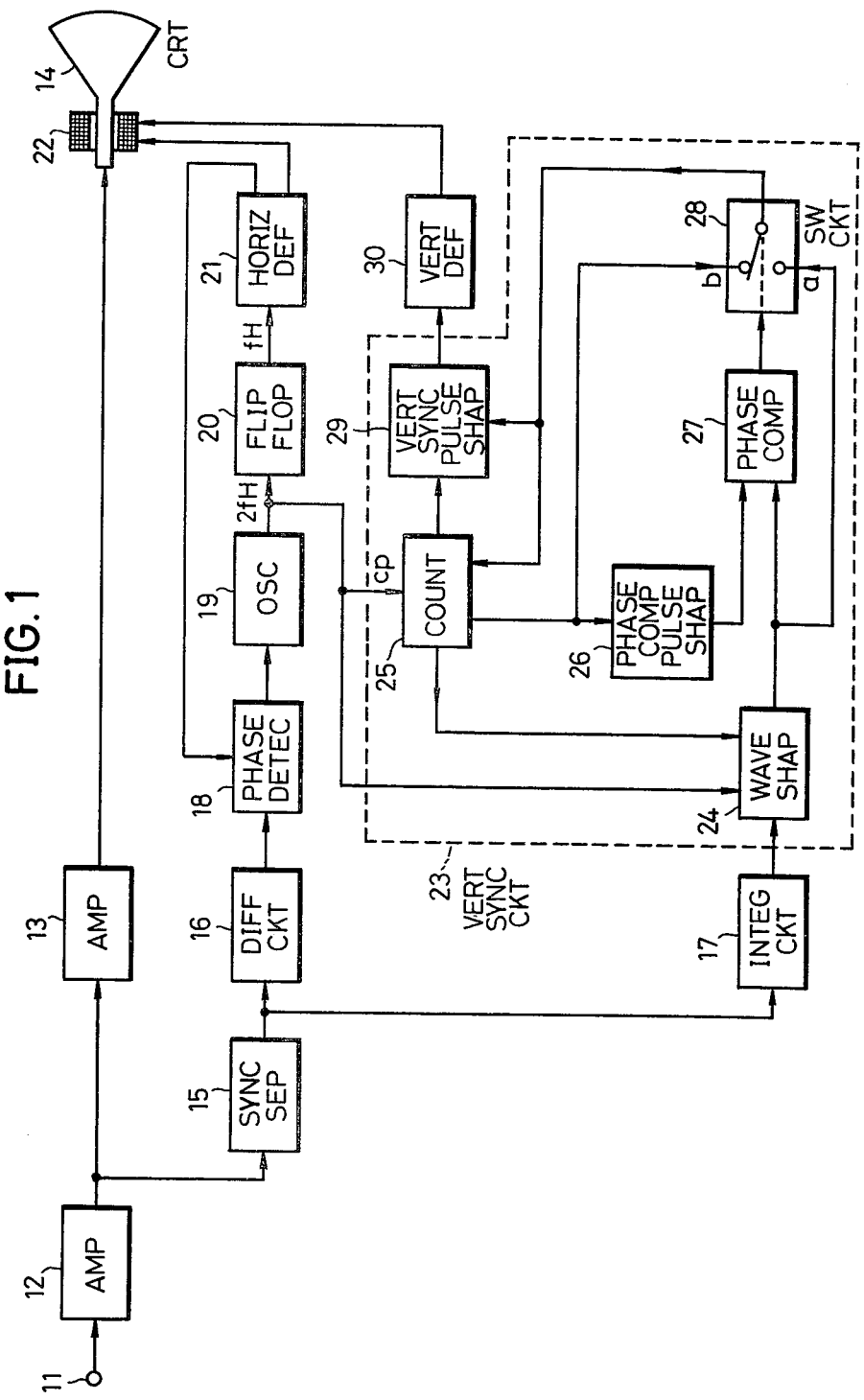
FIG. 1 is a block system diagram of one example of a deflection circuit system in which the vertical synchronization circuit according to the present invention is applied.

A deflection circuit of a count-down system in which a vertical synchronization circuit according to the present invention is applied will first be described with reference to FIG. 1, in which the system is shown as a block diagram. This count-down system utilizes the existence of a specific relationship between the horizontal scanning period and the vertical scanning period. The ratio of these two periods is 2/525 in an NTSC system, principally 2/625 in a PAL system and a SECAM system, and 2/819, 2/405, etc., in other systems. The following description with respect to preferred embodiments of the invention is set forth on the basis of the ratio 2/525 of the two periods with the NTSC system taken as one example. A composite video signal detected by a video detection signal (not shown) is applied to an input terminal 11. The composite video signal thus introduced into the circuit system is amplified by an amplifier 12. The amplified output of the amplifier 12, on one hand, is further amplified by an amplifier 13 and then supplied to a cathode-ray tube 14.

The amplified composite video signal from the amplifier 12, on the other hand, is supplied to a synchronizing signal separation circuit 15, where the composite synchronizing signal comprising the horizontal synchronizing signal and the vertical syncronizing signal is separated. This composite synchronizing signal, on one hand, is supplied to a differentiation circuit 16, where the horizontal synchronizing signal is separated, and, on the other hand, is supplied to an integration circuit 17, where the vertical synchronizing signal is separated.

The horizontal synchronizing signal thus separated out by the differentiation circuit 16 is supplied to a phase detection circuit 18 and is subjected to phase detection with a signal from a horizontal deflection circuit 21 described hereinafter. The resulting output signal of the phase detection circuit 18 is fed to an oscillator 19 and controls the phase of the oscillation of this oscillator. The oscillator 19 oscillates at a frequency 2 fH which is twice the horizontal scanning frequency fH (of 15.75 KHz in the case of a color video signal of an NTSC system). The resulting oscillation output of the oscillator 19, on one hand, is supplied to a flip-flop 20, where its frequency is stepped down to ½ and, as a signal of a frequency fH, is supplied to the horizontal deflection circuit 21.

The output signal of the horizontal deflection circuit 21 is applied to a deflection coil 22 of the cathode-ray tube 14 and carries out horizontal deflection. Furthermore, the horizontal deflection circuit 21 produces, as output, fly-back pulses, which are fed back to the above described phase detection circuit 18. As a result, the oscillation phase of the oscillator 19 is so controlled that the phases of the horizontal synchronizing signal from the differentiation circuit 16 and the fly-back pulses from the horizontal deflection circuit 21 coincide.

The vertical synchronizing signal separated out from the integration circuit 17 as mentioned above is supplied to a waveform shaping circuit 24 of a vertical synchronization circuit 23 according to the present invention and is subjected to waveform shaping. On the other hand, the oscillation output of the oscillator 19 is applied as clock pulses to a counter 25 of the vertical synchronization circuit 23 and is there counted. The ratio Tv/Tcp of the period Tv of the vertical synchronizing signal and the period Tcp (=½ fH) of these clock pulses is 525 in the case of a color video signal of an NTSC system. The counter 25 supplies its output to a phase comparison pulse shaping circuit 26 when it has counted 525 clock pulses. The phase comparison pulse shaping circuit 26 thereupon operates in response to the output of the counter 25 to generate and shape pulses having a width within one cyclic period of the clock pulses. The resulting output pulses (hereinafter referred to as the "vertical synchronizing pulses") of this phase comparison pulse shaping circuit 26 are supplied to one of the input terminals of a phase comparator 27.

The vertical synchronizing signal whose waveform has been shaped by the above described waveform shaping circuit 24 is supplied to the other input terminal of the phase comparator 27, where it undergoes phase comparison with the output pulses of the above described phase comparison pulse shaping circuit 26. The resulting output signal of the phase comparator 27 is applied as a switching signal to a switching circuit 28. In FIG. 1, the switching circuit 28 is indicated in conceptual form of generalized function as a changeover switch with a movable contact which is switchable between a contact point a connected to the waveform shaping circuit 24 and a contact point b connected to the counter 25.

In the case where the phases of the two input signals of the phase comparator 27 do not coincide, the movable contact of the switching circuit 28 is placed in contact with the contact point a, and the output signal of the waveform shaping circuit 24 is supplied by way of the switching circuit 28 to a reset terminal of the counter 25 and thereby resets this counter 25. Accordingly, when the phases of the two inputs of the phase comparator 27 are not coincident, the counter 25 assumes a state (hereinafter referred to as the "sync mode") wherein it is reset for every input vertical synchronizing signal.

On the other hand, in the case where the phases of the two input signals of the phase comparator 27 coincide, the switch circuit 28 is switched in response to the output of the phase comparator 27, thereby selectively passing phase comparison pulses from the counter 25 and supplying these pulses to the reset terminal of the counter 25 thereby to reset this counter 25. Accordingly, when the phases of the two inputs of the phase comparator 27 coincide, the counter 25 assumes a state (hereinafter referred to as the "count-down mode") wherein it frequency-divides the clock pulses to 1/525.

Also included in the vertical synchronization circuit 23 according to the invention is a vertical synchronizing pulse shaping circuit 29, which operates in response to the output pulses of the switching circuit 28 obtained in the above described manner and to the counted output of the counter 25 produced as output at the time instant at which the counter 25 has counted a specific number of clock pulses (for example, 25) from the reset time instant of the counter 25 to produce, as output, vertical synchronizing pulses synchronized with the vertical synchronizing signal for both the sync mode and the count-down mode. These vertical synchronizing pulses are supplied to a vertical deflection circuit 30.

From this vertical deflection circuit 30, a saw-tooth wave synchronized with the vertical synchronizing pulses is obtained and supplied to the deflection coil 22 of the cathode-ray tube 14 thereby to cause vertical deflection.

Figure 2:
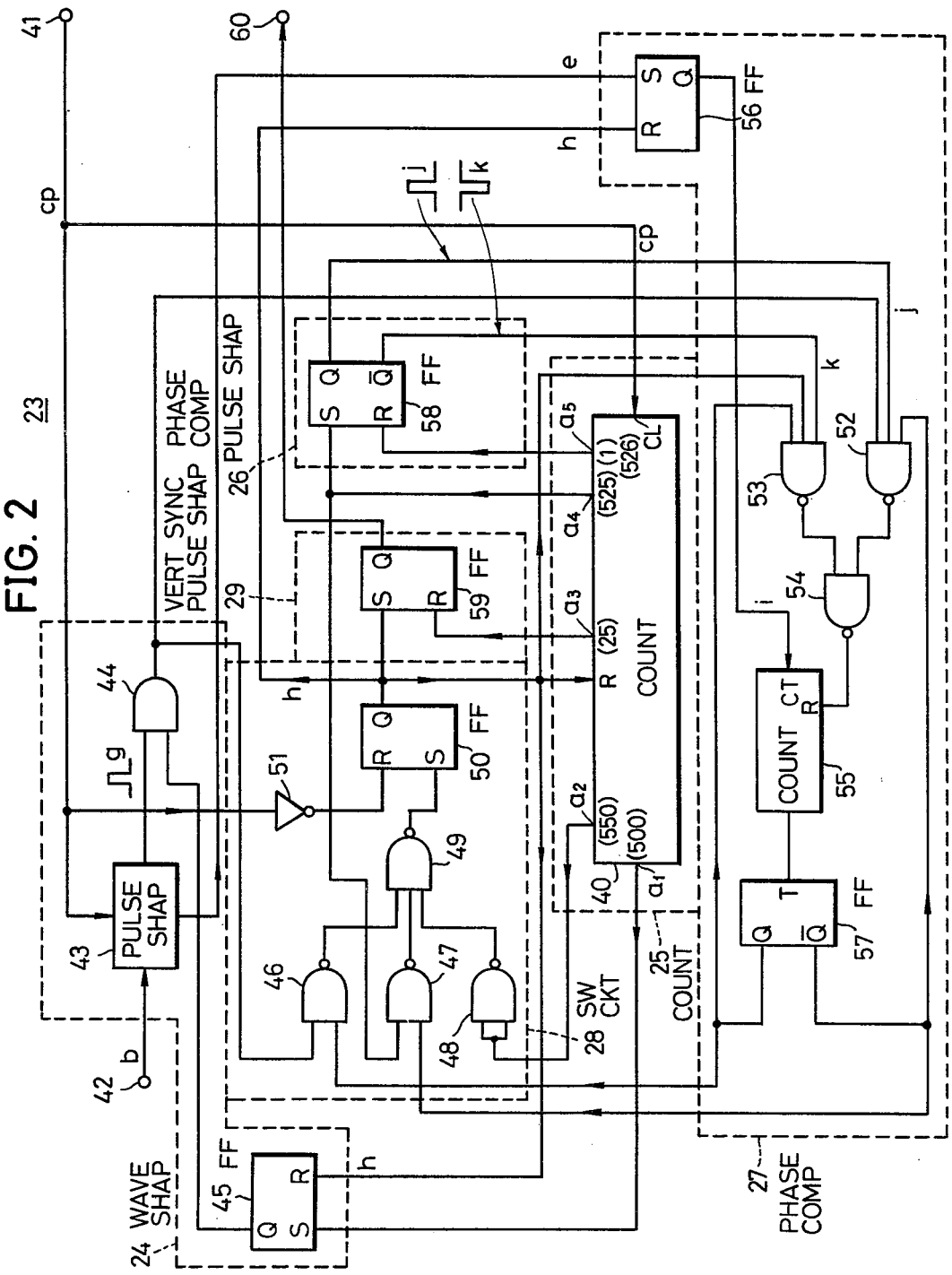
FIG. 2 is a circuit system diagram of one embodiment of an essential part of the block system shown in FIG. 1.

One embodiment of the vertical synchronization circuit 23 according to the present invention, as applied in the above described system illustrated in block system form, will now be described more specifically in conjunction with FIG. 2.

Figure 4:
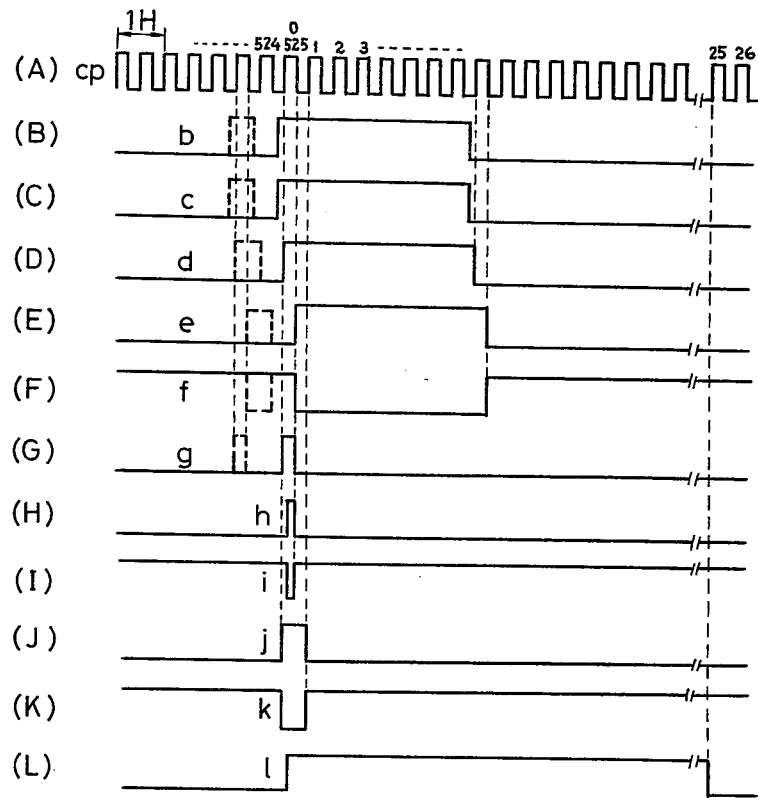
FIGS. 4(A) through 4(L) are signal waveform diagrams respectively for a description of the operation of the circuit of the invention.

The counter 25 is in the form of a ripple counter 40 comprising 10 flip-flops in cascade connection and counts clock pulses cp, as indicated in FIG. 4A, from the oscillator 19 which have been supplied through a terminal 41 to a clock terminal CL. This counter 40 further has a reset input terminal R and output terminals $a_1$, $a_2$, $a_3$, $a_4$ and $a_5$ which respectively produce pulses as output only when the clock pulse count is, for example, 500, 550, 25, 525, 1, and 526.

A vertical synchronizing signal b, of a waveform as indicated in FIG. 4B, which has been supplied from the integration circuit 17 through a terminal 42 is supplied to a pulse shaping circuit 43, described hereinafter, in the waveform shaping circuit 24, where they are waveform-shaped into vertical synchronizing pulses g of a waveform as indicated in FIG. 4G. When noise is not admixed in the vertical synchronizing signal b, this signal b assumes a waveform as indicated by solid line in FIG. 4B, and the vertical synchronizing pulses g also assume a waveform as indicated by solid line in FIG. 4G.

These vertical synchronizing pulses g are applied to one of the input terminals of an AND gate 44. To the other input terminal of this AND gate 44 is applied a Q output of a reset-set (RS) flip-flop 45 which is set by an output pulse from the terminal $a_1$ at the instant when 500 clock pulses have been counted by the counter 40. Vertical synchronizing pulses are passed through the AND gate 44 in the time interval from the instant at which the counter 40 has counted 500 clock pulses to the instant when the RS flip-flip 45 is reset. These vertical synchronizing pulses are fed respectively to a two-input NAND gate 46 and a three-input NAND gate 52. When the counter 40 counts 525 clock pulses, a pulse is produced as output from the output terminal $a_4$ and is supplied respectively to a two-input NAND gate 47 and to the set terminal S of an RS flip-flop 58.

At the time of the sync mode, the Q terminal and the $\overline{Q}$ terminal of a T-type flip-flop 57 of the phase comparator 27 are respectively at high (H) level and low (L)

level. For this reason, one of the inputs of the NAND gate 46 is at H level, while one input of the NAND gate 47 is at L level. As a consequence, NAND gates 46 and 49 are operated, and an RS flip-flop 50 is set by the vertical synchronizing pulses which have passed through the AND gate 44. The output h of a waveform as indicated in FIG. 4H of the flip-flop 50 at this time resets the counter 40 to zero and, at the same time, causes resetting of the flip-flop 45, setting of an RS flip-flop 59, and resetting of an RS flip-flop 56. The flip-flop 59 is reset by a pulse which is produced as output from the output terminal a$_3$ at the instant when the counter 40 counts 25 clock pusles. For this reason, the pulse width of the output pulses of the flip-flop 59 becomes equal to 25 periods of the clock pulses. These output pulses are supplied as vertical syncrhonizing pulses through a terminal 60 to the vertical deflection circuit 30.

When, in the sync mode, vertical synchronizing pulses are not introduced as input from the AND gate 44 into the NAND gate 46, the counter 40 continues to count and, therefore, must be reset in some state after the count of 525. In this example, at the instant when the counter 40 counts 550 pulses, a pulse is produced through the terminal a$_2$ and causes NAND gates 48 and 49 to operate, whereby the flip-flop 50 is set, and the counter 40 is reset.

At the time of the count-down mode, the Q and $\bar{Q}$ terminals of the flip-flop 57 are respectively at L and H levels. For this reason, when the counter 40 counts 525 clock pulses, an output pulse from its terminal a$_4$ causes the NAND gates 47 and 49 to operate, the flip-flop 50 to be set, and the counter 40 to be reset.

In either of the above described cases, the flip-flop 50 is being supplied through its set terminal with pulses from the NAND gate 49 and through its reset terminal with the clock pulses cp which have been inverted by an inverter 51. For this reason, the flip-flop 50, after being set, is reset at the starting instant of the L level of the clock pulses. This period during which the flip-flop 50 is set becomes substantially a period of H level within one cyclic period of the clock pulses. Furthermore, vertical synchronizing pulses are produced as output from the flip-flop 59.

The flip-flop 58, the three-input NAND gates 52 and 53, the two-input NAND gate 54, a counter 55, and the flip-flop 57 carry out the aforementioned phase comparison operation. The flip-flop 58 is set by an output pulse of the terminal a$_4$ of the counter 40 and is reset by an output pulse of the terminal a$_5$. As a consequence, phase comparison pulses of H level and L level havng a width of one cyclic period of the clock pulses are produced as output from the output terminals Q and $\bar{Q}$ of the flip-flop 58 from the instant when the counter 40 counts 525 pulses and are fed to the NAND gates 52 and 53. The counter 55 counts the output vertical synchronizing pulses of the flip-flop 56. When the counter 55 counts a predetermined number of cycles (4 cycles in the present embodiment of the invention), pulses are produced as output, whereupon the output of the flip-flop 57 is inverted. In the case of the sync mode, the terminals Q and $\bar{Q}$ of the flip-flop 57 are respectively at H and L levels.

In the case where, in the sync mode, the phases of the reset pulse of the counter 40 and the phase comparison pulses from the flip-flop 58 do not coincide, the NAND gates 53 and 54 operate at every instant of generation of the above mentioned reset pulse (the outputs of the NAND gates 53 and 54 at this time being respectively at L and H levels), and the counter 55 is reset. Consequently, the counter 55 can no longer continue to count 4 cycles of the vertical synchronizing pulses from the flip-flop 59, and the output of the flip-flop 57 is not inverted. Thus, the operational state becomes one wherein the sync mode is continued.

On one hand, when, in the sync mode, the phases of the above mentioned reset pulses and the phase comparison pulses coincide, the above described resetting operation of the counter 55 by the NAND gates 53 and 54 are no longer carried out, and the counter 55 carries out the above mentioned counting of the vertical synchronizing pulses. When count of the counter 55 becomes 4, the output of the flip-flop 57 is inverted, and the mode becomes the count-down mode wherein the Q and $\bar{Q}$ outputs are respectively at L and H levels. When the phases of the vertical synchronizing pulses g and the output phase comparison pulses of the flip-flop 58 are coincident, the NAND gates 52 and 54 operate, and the counter 55 is reset every time a vertical synchronizing pulse is generated. For this reason the above mentioned count-down mode continues.

On the other hand, when, in the count-down mode, the phases of the above mentioned vertical synchronizing pulses g and the phase comparison pulses do not coincide, the NAND gates 52 and 54 do not operate, and the output of the NAND gate 54 remains at the L level. Accordingly, the counter 55 is not reset. Consequently, after 4 periods of the vertical synchronizing signal, the output of the flip-flop 57 is inverted, and the mode becomes the sync mode. From the above described operation, in the case of a composite video signal wherein the ratio of the horizontal synchronizing signal period and the vertical synchronizing signal period is not 2:525, the operation is continually in the sync mode. On one hand, in the case of a composite video signal having this period ratio relationship of 2:525, the operation in steady state is in the count-down mode, and, even at the time of channel switching or in the case of the same signal, the operation shifts from the count-down mode to the sync mode only in the short period immediately after occurrences such as a variation in the phase of the vertical synchronizing signal. In this case, the operation mode again returns to the count-down mode after vertical synchronization has been attained.

Next, the pulse shaping circuit 43 and the flip-flop 56 constituting essential parts of the circuit of the present invention will now be described more fully.

First, one example of the pulse shaping circuit 43 will be described with reference to FIG. 3. The vertical synchronizing signal b from the integration circuit 17 is introduced into this circuit 43 through a terminal 42 and fed respectively to one of the input terminals of a two-input NOR gate 70 and to the reset terminal of an RS flip-flop 71. To the Q output terminal of the flip-flop 71 are successively connected, in cascade arrangement, D-type flip-flops 72 and 73. Clock pulses cp introduced through the terminal 41 and clock pulses $\overline{cp}$ inverted by an inverter 74 are supplied respectively to the clock-pulse terminals of these flip-flops 72 and 73.

The $\bar{Q}$ output terminal of the flip-flop 73 is connected to the other input terminal of the NOR gate 70 and to one of the input terminals of a two-input AND gate 75. The other input terminal of the AND gate 75 is connected to the Q output terminal of the flip-flop 72. The Q output terminal of the flip-flop 73 is connected to the set terminal of the flip-flop 56. The flip-flops 72 and 73 are so adapted that the level, and the level of the inverted polarity thereof, of the pulse introduced as input into the D terminals at the instant of rise of clock pulses cp are respectively sent out as output at the Q and $\overline{Q}$ terminals.

Until immediately prior to the instant at which the vertical synchronizing signal b is introduced as input, the flip-flop 71 is in its reset state, and its Q terminal is at an L level. At this time, the Q terminals of the flip-flops 72 and 73 are both at an L level. Consequently, the $\overline{Q}$ terminal of the flip-flop 73 is at an H level, and the output level of the NOR gate 70, that is, the input level of the reset terminal of the flip-flop 71 is at an L level.

When, with the circuit in the above described state, the vertical synchronizing signal b is introduced, the flip-flop 71 is set, and a signal c of H level of a waveform as indicated in FIG. 4C is applied to the D terminal of the flip-flop 72. As a consequence, a signal d which assumes an H level at the instant of rise of a clock pulse cp as indicated in FIG. 4D is produced at the Q terminal of the flip-flop 72. Furthermore, a signal e which assumes an H level at the instant of fall of a clock pulse cp as indicated in FIG. 4E is produced at the Q terminal of the flip-flop 73.

The above described state continues as long as the flip-flop 71 is in its set state. Accordingly, the vertical synchronizing pulses g of the waveform indicated in FIG. 4G of H level are led out of the AND gate 75 during the period in which the Q output signal d as indicated in FIG. 4D of the flip-flop 72 and the $\overline{Q}$ output signal f as indicated in FIG. 4F of the flip-flop 73 are both of H level. The pulse width of these vertical synchronizing pulses g correspond to the pulse width of H level of the first clock pulse after the rise of the vertical synchronizing signal b (this clock pulse being the 525th clock pulse at the time of count-down mode).

After these vertical synchronizing pulses g have been produced as output, the $\overline{Q}$ output of the flip-flop 73 becomes of L level. For this reason, when, in this state, the vertical synchronizing signal b is no longer introduced as input thereinto, the flip-flop 71 is reset, its set terminal becoming of L level and its reset terminal becoming of H level. As a consequence, at the instant of rise of the clock pulse of the interval succeeding the instant at which the flip-flop 71 is reset (here, the term "interval" meaning the period from the instant of a clock pulse to the instant of rise of the succeeding clock pulse), the Q output of the flip-flop 72 becomes of L level as indicated in FIG. 4D, and, at the instant of fall of that clock pulse, the Q output of the flip-flop 73 becomes of L level as indicated in FIG. 4E. This state continues during the time the flip-flop 71 is in its reset state.

In the case where noise is admixed immediately before the vertical synchronizing signal b, if there are two or more intervals of the clock pulse of the leading edge of this noise from the leading edge of the vertical synchronizing signal b, and there are one or more intervals of the clock pulses of the trailing edge of the noise, the vertical synchronizing pulse g will be produced as output with the phase of normal operation as indicated by solid line in FIG. 4G in spite of the period of admixture of the noise.

In FIG. 4B, the pulse indicated by intermittent line represents the above mentioned noise which has become admixed immediately before the vertical synchronizing signal. When this noise exists, the Q output c of the flip-flop 71, the Q output d of the flip-flop 72, the Q output e and the $\overline{Q}$ output f of the flip-flop 73, and the output g of the AND gate respectively become pulses as indicated by intermittent lines in FIGS. 4C, 4D, 4E, 4F, and 4G. However, if a normal vertical synchronizing signal b arrives thereafter as input, the normal vertical synchronizing pulse g as indicated by solid line in FIG. 4G is generated. For this reason, it is possible to carry out, in the normal manner, the phase comparison operation in the phase comparator 27.

Furthermore, irrespective of the pulse width possessed by the vertical synchronizing signal b, a pulse corresponding to the H level period of one interval of the succeeding clock pulse of the instant at which the flip-flop 71 is set is produced as the vertical synchronizing signal g in the output of the AND gate 75 and is supplied as an output of the pulse shaping circuit 43 to the AND gate 44.

Next, the operation of the RS flip-flop 56 will be described. The Q output signal e of the flip-flop 73 is applied to the set terminal of this flip-flop 56, while a Q output pulse h of the flip-flop 50, which is used also as a reset pulse of the counter 40, is applied to the reset terminal of the flip-flop 56. As described hereinbefore in conjunction with FIG. 4E, the above mentioned signal e is a pulse having a pulse width which is of H level from the instant of fall of the succeeding clock pulse following the instant at which the flip-flop 71 is set to the instant of fall of the succeeding clock pulse following the instant at which this flip-flop 71 is reset. The flip-flop 56 is set at the instant of rise of the signal e.

The counter 40 is reset by a reset pulse generated as a result of the passing of a pulse, which has been produced as output from the terminal $a_4$ at the instant when the counter 40 counts 525 clock pulses, through the NAND gates 47 and 49 and the flip-flop 50. Since the reset pulse is produced in this manner, the instant of rise of the reset pulse is somewhat delayed relative to the instant of rise of the output pulse of the terminal $a_4$ or the vertical synchronizing signal g. Furthermore, a clock pulse $\overline{cp}$, which has been inverted by the inverter 51 is applied to the reset terminal of the flip-flop 50. For this reason, after the flip-flop 50 has been set, it is reset at the instant of fall within the same period of the clock pulse. Accordingly, the reset pulse supplied from the flip-flop 50 to the counter 40 becomes as indicated by h in FIG. 4H.

The flip-flop 56 is reset at the instant of rise of this reset pulse h. Accordingly, the Q output signal of the flip-flop 56 is a pulse of negative polarity, one of which is generated in one vertical scanning period, as indicated by i in FIG. 4I. This signal is applied to the count input terminal of the counter 55.

The case where the pulse shaping circuit 43 is caused to operate by noise, and a plurality of the pulse e applied to the set terminal of the flip-flop 56 are generated within one vertical scanning period may be considered as a supposition. Even in this case, the flip-flop 56 is reset by the reset pulse h with respect to the counter 40 which is always produced as output once within one vertical scanning period and is thereafter once set by the succeeding pulse e. Then, as long as the reset pulse h does not arrive next, the flip-flop 56 continues to maintain its set state. For this reason, erroneous operation due to noise does not occur, and only one pulse is generated at the Q output terminal of the flip-flop 56 within one vertical scanning period.

Furthermore, in the case where the circuit assumes a state wherein the vertical synchronizing signal b is no longer supplied, the pulse shaping circuit 43 becomes inoperative, and the flip-flop 56 is no longer set. As a consequence, a pulse from the flip-flop is no longer applied to the count input terminal of the counter 55. Consequently, the counting operation of the counter 55 stops, and the count-down mode is continued at the time of count-down mode state, while the sync mode is continued at the time of sync mode state.

As is apparent from the foregoing description, in the circuit of the instant embodiment of the invention, once vertical synchronization has been attained and the operation assumes the count-down mode, the count-down mode is continued, even when the circuit assumes a state wherein the vertical synchronizing signal is no longer introduced as input, as long as the phase of the input vertical synchronizing signal b does not vary. For this reason, stable vertical synchronization is attained.

The pulses of mutually opposite phase shown in FIGS. 4J and 4K respectively indicate phase comparison pulses j and k which are respectively produced as outputs from the Q and $\overline{Q}$ terminals of the flip-flop 58 and have a phase relationship as indicated in FIGS. 4A through 4K with the above mentioned clock pulses cp and pulses b through i. FIGS. 4A through 4K indicate the waveforms of pulses at various parts of the circuit at the time of the count-down mode. The Q output signal l as indicated in FIG. 4L of the flip-flop 59, which is set by the pulse h at the time of this count-down mode and is reset by a pulse sent out as output from the terminal $a_3$ at the time when the counter 40 counts 25 clock pulses is supplied as a vertical synchronizing pulse through the terminal 60 to the vertical deflection circuit 30.

Figure 3:
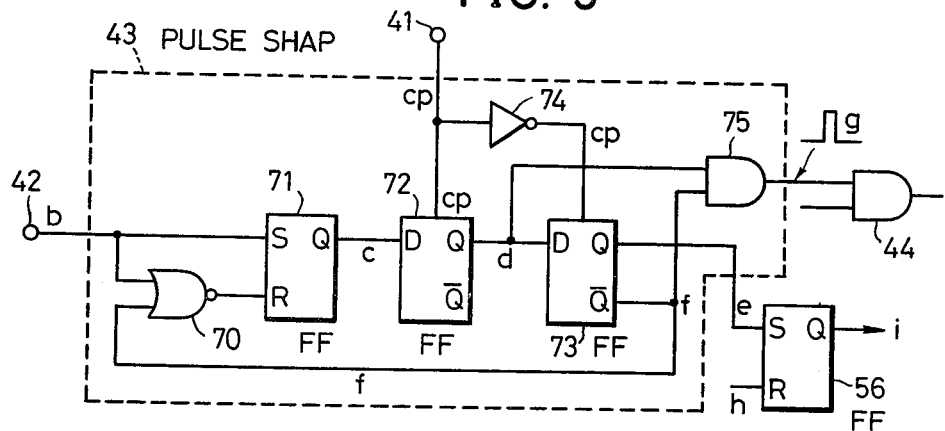
FIG. 3 is a circuit diagram of one embodiment of an essential part of the circuit system illustrated in FIG. 2.

In the circuit illustrated in FIG. 3, the clock pulses introduced into the flip-flops 72 and 73 may be clock pulses of two phases of different rises. Furthermore while the frequency of the clock pulses cp is twice the horizontal scanning frequency in the above described embodiment of the invention, this frequency relationship is not thus limited, and this clock pulse frequency may be any even-number multiple of the horizontal scanning frequency. In addition, for the signal applied to the set input terminal of the flip-flop 56, the output vertical synchronizing signal b of the intergration circuit 17 or the output vertical synchronizing pulse g of the pulse shaping circuit 43 may be used. However, in the case where the vertical synchronizing pulse g is used as the set input signal of the flip-flop 56, it is necessary to use an RS flip-flop of reset-priority type for the flip-flop 56.

In still another modification, a circuit connection organization wherein a similar operation is carried out with the use of JK flip-flops instead of D-type flip-flops and RS flip-flops may be adopted. Furthermore, in order to obtain an even more stable operation, in the circuit illustrated in FIG. 2, an integration circuit for delaying the Q output of the flip-flop 50 (the delay time, however, being less than the pulse width of the H level of the clock pulses) may be provided.

In the circuit of the organization according to the present invention, the waveform shaping circuit 24 produces as output a pulse synchronized with a clock pulse every time a vertical synchronizing signal is introduced as input thereinto. For this reason, even when noise is admixed immediately before the vertical synchronizing signal, pulses synchronized with the normal vertical synchronizing signal can be positively obtained as long as the vertical synchronizing signal is introduced as input. Accordingly, the characteristics with respect to noise at the time of the count-down mode can be greatly improved over those of the prior art. Furthermore, pulses synchronized with the above mentioned clock pulses can be stably generated irrespective of the pulse width of the vertical synchronizing signal.

Still another feature of the present embodiment of the invention is that the flip-flop 56 having a set terminal to which is supplied a signal responsive to the vertical synchronizing signal from the pulse shaping circuit 43 and having a reset terminal to which is supplied a reset pulse with respect to the counter 40 for counting clock pulses and the counter 55 having a count input terminal to which is supplied the output signal of this flip-flop 56 are provided in the circuit organization of the phase comparator 27. For this reason, as long as vertical synchronization is attained, and the circuit once assumes the count-down mode, the count-down mode operation is continued, and stable vertical synchronization is attained provided that phase of the vertical synchronizing signal does not fluctuate.

Further, this invention is not limited to these embodiments but various variations and modifications may be made without departing from the scope of the invention.

What is claimed is:

1. A vertical synchronization circuit comprising:
    means for separating a horizontal synchronizing signal and a vertical synchronizing signal from a composite video signal introduced as input;
    oscillation means for oscillating and generating, in response to the horizontal synchronizing signal thus separated, clock pulses of a frequency of repetition which is an even-number multiple of the horizontal scanning frequency;
    a first counter for counting the clock pulses thus generated and producing as output a first pulse when the pulse count becomes a predetermined number correlated to the ratio of the horizontal scanning period and the vertical scanning period of the composite video signal;
    a waveform shaping circuit supplied with the vertical synchronizing signal thus separated and the clock pulses thus generated and producing as output a second pulse, which is synchronized with the clock pulses, every time the vertical synchronizing signal is supplied as input;
    means for shaping the first pulse from the first counter and producing as an output phase comparing pulse;
    phase comparison means for comparing the phases of the phase comparing pulse thus produced as output and of the second pulse from the waveform shaping circuit;
    switching means controlled in switching operation by output pulses of the phase comparison means and thereby carrying out the operation of selectively producing as output the second pulse out of the first and second pulses and supplying the second pulse to the first counter thereby to place the first counter in a first reset state when the phases of the two input pulses supplied to the phase comparison means are not continuously coincident during a specific vertical scanning period and the operation of selectively producing as output the first pulse and supplying the same to the first counter thereby to place the first counter in a second reset state when the phases of two input pulses supplied to the phase comparison means are continuously coincident in specific vertical scanning periods; and means for shaping pulses produced as output from the first counter and synchronized with the vertical synchronizing signal.

2. A vertical synchronization circuit as claimed in claim 1 wherein the waveform shaping circuit comprises: an RS flip-flop set by the separated vertical synchronizing signal; a first D-type flip-flop to which is applied as input the output of the RS flip-flop; a second D-type flip-flop cascade connected to the first D-type flip-flop; means for supplying with different phases the clock pulses respectively to clock input terminals of the first and second D-type flip-flops; a first gate circuit for subjecting the output pulse of the second D-type flip-flop and the vertical synchronizing signal to a logical operation and resetting the RS flip-flop with a resulting output pulse; and a second gate circuit for subjecting the output pulses respectively of the first and second D-type flip-flops to a logical operation thereby producing as output the second pulse.

3. A vertical synchronization circuit as claimed in claim 1 wherein the phase comparison means comprises an RS flip-flop having a set terminal to which is supplied a pulse which is generated once every vertical scanning period from the waveform shaping circuit and having a reset terminal to which is supplied a pulse from the switching means and a second counter to which is supplied the output pulses of the RS flip-flop as input for counting.

4. A vertical synchronization circuit as claimed in claim 1 wherein the oscillation means oscillates and generates clock pulses of a frequency which is twice the horizontal scanning frequency, and the first counter produces as output the first pulse every time it counts 525 of the clock pulses.

5. A vertical synchronization circuit as claimed in claim 2 wherein the waveform shaping circuit further has a second RS flip-flop having a set terminal to which is supplied the output signal of the first counter and a reset terminal to which is supplied a reset signal for the first counter and a third gate circuit for AND-gating the output of the second gate circuit and the output of the second RS flip-flop.

* * * * *